United States Patent [19]
Kuhn et al.

[11] Patent Number: 5,230,311
[45] Date of Patent: Jul. 27, 1993

[54] MASS COMPENSATOR FOR AN INTERNAL COMBUSTION PISTON ENGINE

[75] Inventors: Michael Kuhn, Lippertshofen; Xaver Stemmer, Reichertshofen; Manfred Schindler, Markt Schwaben; Walter Vilsmeier, Maitenbeth, all of Fed. Rep. of Germany

[73] Assignee: Audi AG, Ingolstadt, Fed. Rep. of Germany

[21] Appl. No.: 856,147

[22] PCT Filed: May 31, 1991

[86] PCT No.: PCT/EP91/01013

§ 371 Date: Mar. 31, 1992

§ 102(e) Date: Mar. 31, 1992

[87] PCT Pub. No.: WO92/02720

PCT Pub. Date: Feb. 20, 1992

[30] Foreign Application Priority Data

Aug. 1, 1990 [DE] Fed. Rep. of Germany ....... 4024400

[51] Int. Cl.$^5$ ............................................. F02B 25/06
[52] U.S. Cl. ................................... 123/192.2; 74/603
[58] Field of Search ................... 123/192.2; 74/603

[56] References Cited

U.S. PATENT DOCUMENTS

| | | | |
|---|---|---|---|
| 2,182,988 | 12/1939 | Iseler | 74/604 |
| 3,800,625 | 4/1974 | Seino et al. | 74/604 |
| 4,683,849 | 8/1987 | Brown | 123/192.2 |

FOREIGN PATENT DOCUMENTS

2904066 8/1980 Fed. Rep. of Germany.
746399 3/1956 United Kingdom.

*Primary Examiner*—Noah P. Kamen
*Attorney, Agent, or Firm*—Lalos & Keegan

[57] ABSTRACT

The invention relates to a mass compensator for an internal combustion piston engine with three banks of four cylinders and a crankshaft with four crank pins on each of which operates one connecting rod of each bank of cylinders, whereby to compensate the especially second-order mass forces and moments, compensating shafts bearing balance weights are fitted which are driven in opposite directions at twice the crankshaft speed and whose axis of rotation co-ordinates to the crankshaft axis substantially meet the conditions below:

$$y_2 = -2y_1 \text{ and } x_2 = =2x_1.$$

8 Claims, 5 Drawing Sheets

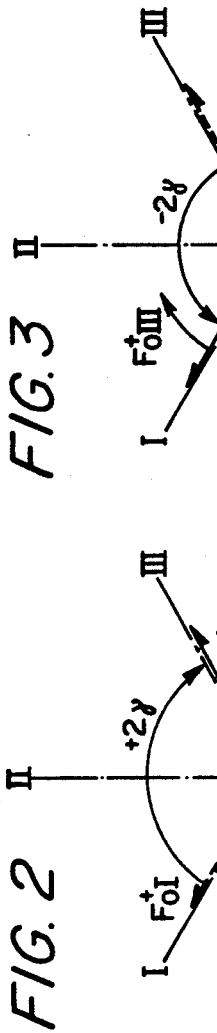
FIG. 1
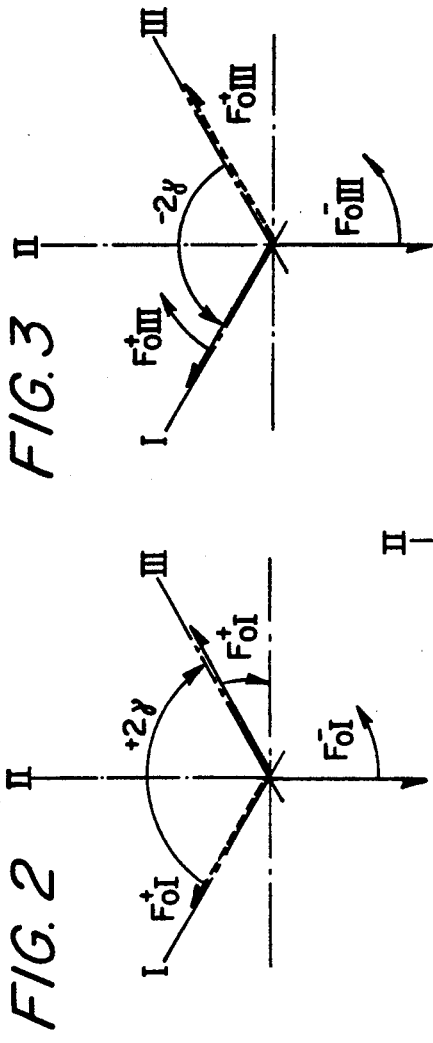
FIG. 2
FIG. 3
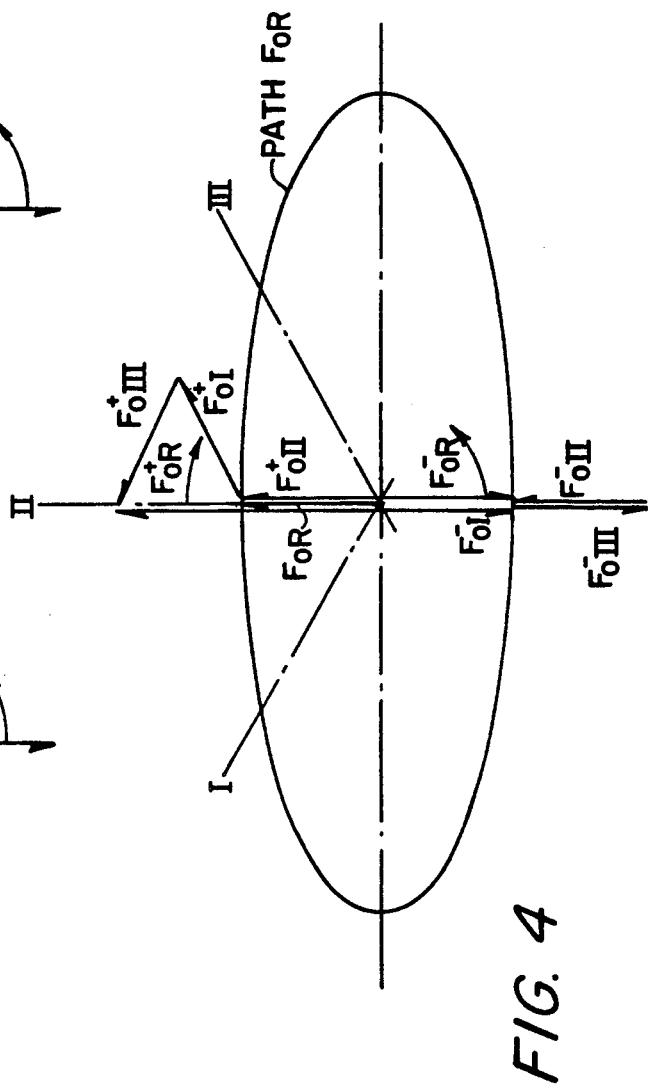
FIG. 4
REFERENCE POSITION: CYL.5 AT TOP DEAD CENTER

REFERENCE POSITION: CYL. 5 AT TOP DEAD CENTER

REFERENCE POSITION: CYL. 5 AT TOP DEAD CENTER

REFERENCE POSITION: CYL. 5 AT TOP DEAD CENTER

MASS COMPENSATOR FOR AN INTERNAL COMBUSTION PISTON ENGINE

BACKGROUND OF THE INVENTION

The invention relates to a mass compensator for an internal combustion piston engine with three cylinder banks offset relative to one another, each bank having four cylinders and one common crankshaft with four crank pins on which one piston-connecting rod unit of each cylinder bank acts.

Internal combustion piston engines of this design are known as W-type engines. The preferred cylinder angel is 60 degrees to one yields a spread of the outside cylinder banks of 120 degrees to one another. If an internal combustion engine of this type is to be installed in a motor vehicle, the installation spaces are very cramped and they must be taken into account in the engineering of the internal combustion engine, for example, also in mass compensation. Problems arise especially for balancing of mass forces and moments of the 2nd order if these forces and moments are to be balanced by compensating shafts driven in opposite directions with twice the engine rpm.

SUMMARY OF THE INVENTION

The object of the invention is to provide a mass compensator with compensating shafts in an internal combustion engine of the generic type; at relatively low construction cost the compensator enables reliable balancing of free mass forces and moments, especially of the second order.

As was recognized by the inventors, in the generic W-engine the free mass forces and moments, especially of the second order, can suffice with only two compensating shafts driven in opposite directions and at twice the engine rpm, these shafts with correspondingly matched balancing weights, when their arrangement satisfies the relation disclosed herein.

With consideration of these constraints, a preferred spatial arrangement can be structurally implemented in an especially favorable manner on the internal combustion engine. Thus, the compensating shafts which lie relatively close to one another in space can be driven via a belt drive or chain drive with little noise and vibration. In addition there remains sufficient installation space for the drives and assemblies necessary and conventional on internal engines, such as camshafts, fan drive, generator, steering pump, etc.

The advantages of the present invention will become more apparent to those persons having ordinary skill in the art to which the present invention pertains from the following description taken in conjunction with the accompanying drawings.

BRIEF DESCRIPTION OF THE DRAWINGS

FIGS. 1–8 show the theoretical relationships of the mass compensator as per the invention according to the principle of the vector addition method.

DETAILED DESCRIPTION

The mass forces $F_o(\phi)$ of order i which oscillate along one cylinder axis can be represented by two vectors rotating in opposite direction with $i \times \omega$ revolutions per minute. Vectors rotating both positively and negatively are thus mirror inverted to the cylinder axis. At any time ($\sphericalangle \phi = \omega t$) the horizontal vector components cancel out and the vertical components add up to $F_o = A \omega^2 \cos(i\phi)$; for the second engine configuration $A = \lambda m_o r$.

In engines with several cylinder banks the sums are formed from the positively and negatively rotating vectors of the other cylinder banks.

Figure 7:
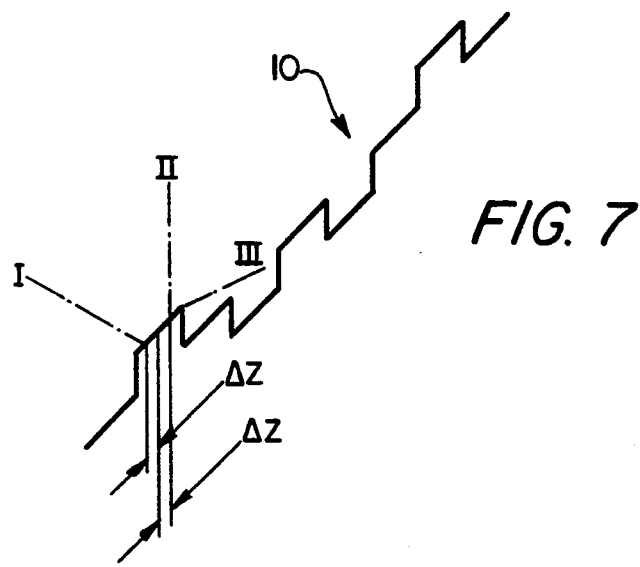

In FIG. 1 the three cylinder banks I, II and III of a W12 internal combustion piston engine are plotted in broken lines, for which a cranked portion of the shaft according to a four cylinder in-line engine is assumed (compare FIG. 7, crankshaft 10). The first cylinder of cylinder bank II (=cylinder five) at top dead center [TDC] is selected as the reference position. The right-angle bend of the crankshaft 10 is in the stretched position relative to this cylinder bank so that vectors $F^+_{oII}$ and $F^-_{oII}$ point in cylinder axis direction II. These vectors are shown in FIG. 1.

In FIG. 2 vector $F^+_{oI}$ represents the position of the positively rotating vector of cylinder bank I if the crankshaft 10 were imagined to be in the stretched position of bank I. For the selected reference position the cranked portion of the shaft must now be turned by the cylinder through angle $\gamma$ from bank I to bank II. For i=2 (second order) vector $F_{oI}$ turns by $2\gamma$ in the direction of engine revolution into position $F^+_{oI}$. The negatively rotating vector $F^-_{oI}$ of cylinder bank I is then obtained by reflection on cylinder axis I.

FIG. 3 shows the determination of vectors $F^+_{oIII}$ and $F^-_{oIII}$.

In FIG. 4 the positively and negatively rotating vectors are added to $F^+_{oR}$ and $F^-_{oR}$. Here it can be seen that $F^+_{oR}$ and $F^-_{oR}$ can be compensated by two compensating shafts running in opposite directions.

However, the position of the compensating shafts must be selected such that no moments around the longitudinal axis of the crank shaft result from the forces on the compensating shafts. In turn, the reference position for the vector plot in FIG. 4 is cylinder five or the first cylinder of cylinder bank II in the top dead center position.

The free oscillating mass force for the four cylinder in-line engine according to equation $F_o = 4\lambda m_o r \omega^2 \cos 2\phi$ can be represented by one positively and one negatively rotating vector each, of magnitude $F^+_{oI} = F^-_{oI} = 4\lambda m_o r \omega^2$ with constant angular velocity $+2\omega$ or $-2\omega$ ($\gamma$ = cylinder angle, $\phi$ = crank angle).

This yields positively and negatively rotating vectors of magnitude $2\lambda m_o r \omega^2$ based on the three cylinder banks according to equation $F^+_{oI} = F^+_{oII} = F^+_{oIII} = F^-_{oI} = F^-_{oII} F^-_{oIII}$. This yields $F^+_{oR}$, $F^-_{oR}$ =resulting vector, positively or negatively rotating and $F_{oR}$ the resulting vector of variable magnitude from $F^+_{oR}$ and $F^-_{oR}$.

Figure 5:
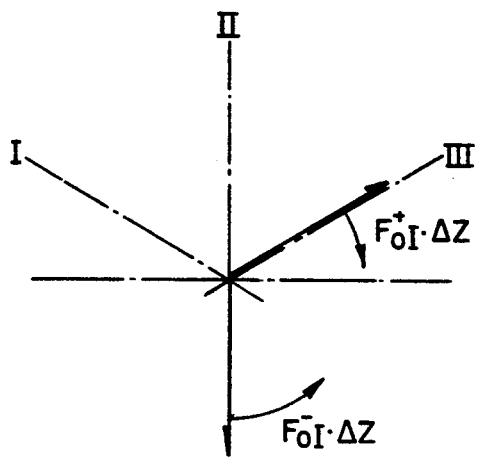
Figure 6:
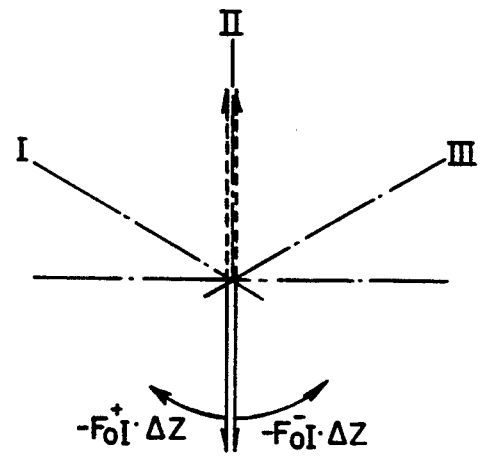

FIGS. 5 and 6 show in vector form the free mass moments of the 2nd order from the connecting rod offset which arises from the fact that in the generic design one connecting rod each from the three cylinder banks acts on a common crankpin of the crankshaft 10. The reference position is in turn cylinder five at top dead center. While the cylinder bank III yields no moment based on central connecting rod action on the crankpin (compare FIG. 7), the resulting moments from the connecting rods which act off-center are plotted in FIGS. 5 and 6.

Figure 8:
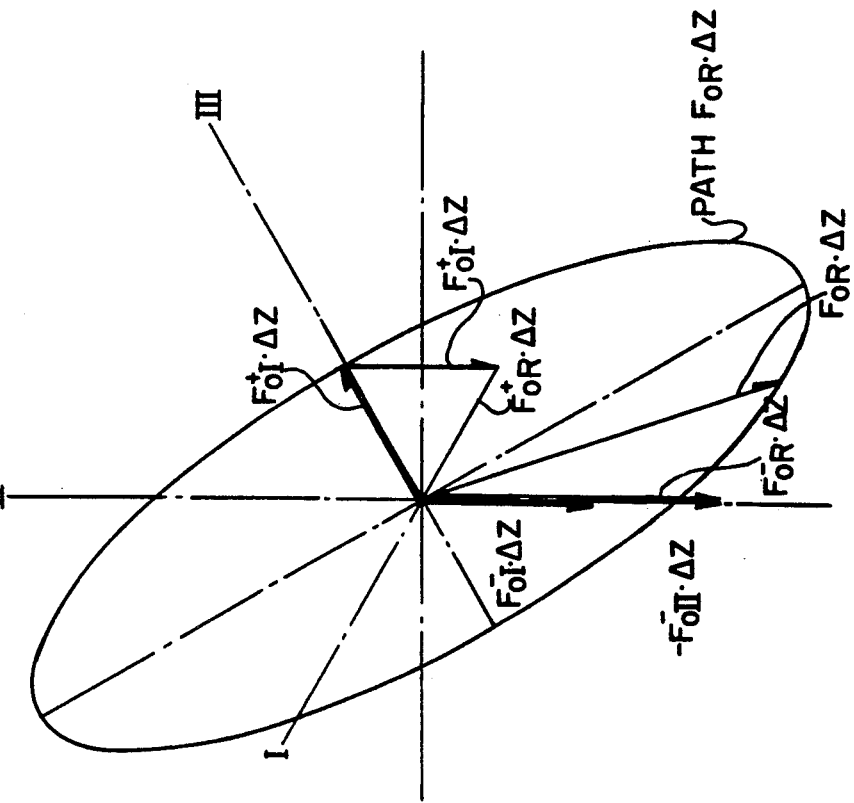

In this case the designations are similar to those in the derivation of free mass forces. For $\Delta z$ it is a matter of the connection rod offset by which the cylinder banks are offset relative to one another (FIG. 7). $\Delta z$ is the lever arm with which the resulting mass forces generate moments around the x and y axes, therefore $F^+_{oII}$ and $F^-_{oII}$ are applied with reversed direction (corresponds to negative lever arm compare FIG. 8). The resulting moment at any time is perpendicular to the direction of $F_{oR} \cdot \Delta z$.

Figure 9:
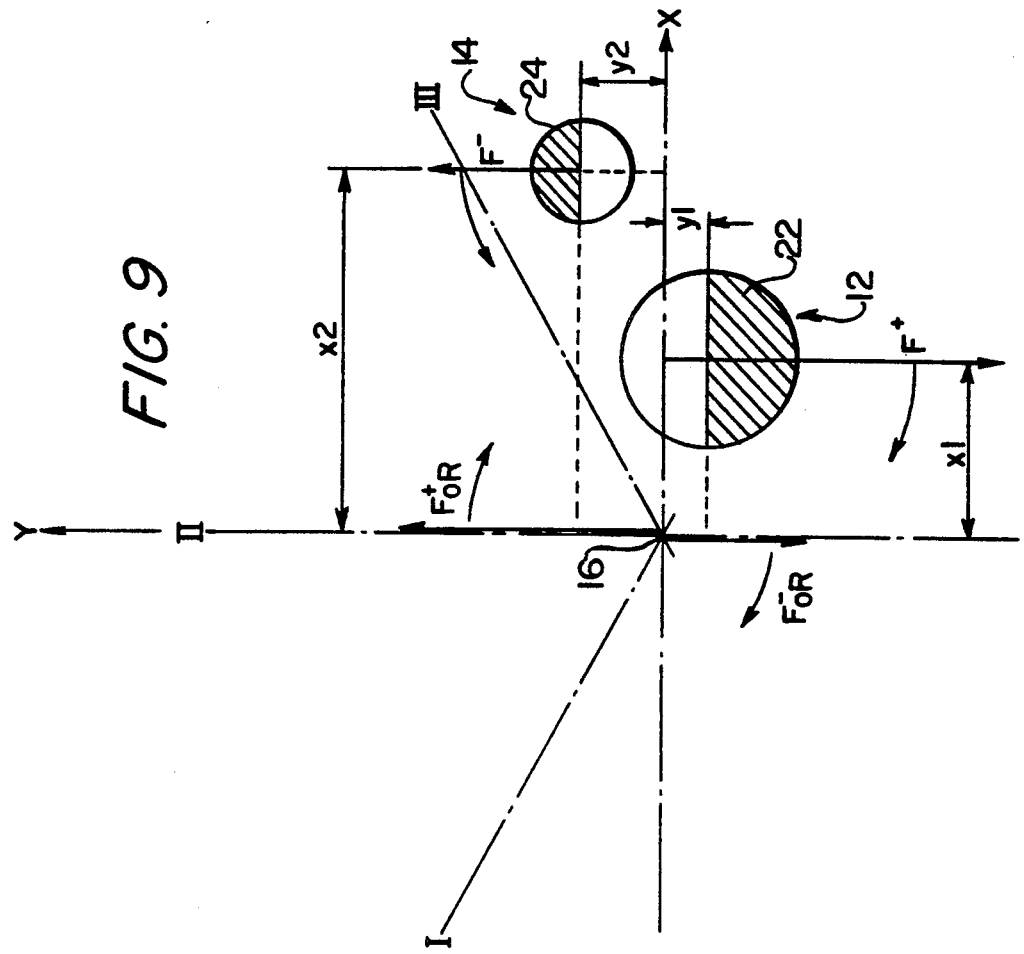
FIG. 9 shows the theoretical arrangement of the compensating shafts according to the relation defined in patent claim 1.

The aforementioned considerations indicate that, as shown in FIG. 9, the free mass forces of the second order $F^+_{oR}$ and $F^-_{oI}$ can be directly balanced by two compensating shafts 12, 14 with unbalance forces $F^+$ and $F^-$. In this case the following holds: $F^+_{oR} = F^+$ and $F^-_{oR} = F^-$. The torques around the longitudinal axis of the crankshaft resulting from the unbalance forces of the compensating shafts can be completely balanced by condition $y_2 = -2y_1$ and $x_2 = +2x_1$ for the location of the compensating shafts 12, 14 and the coordinates of their axis of rotation. The condition derives from the ration of forces $F^+_{oR}/F^-_{oR} = F^+/F^- = 2$.

The mass torque around the x and y axis from the connecting rod offset can be completely balanced by suitable correction masses on the compensating shafts.

Figure 10:
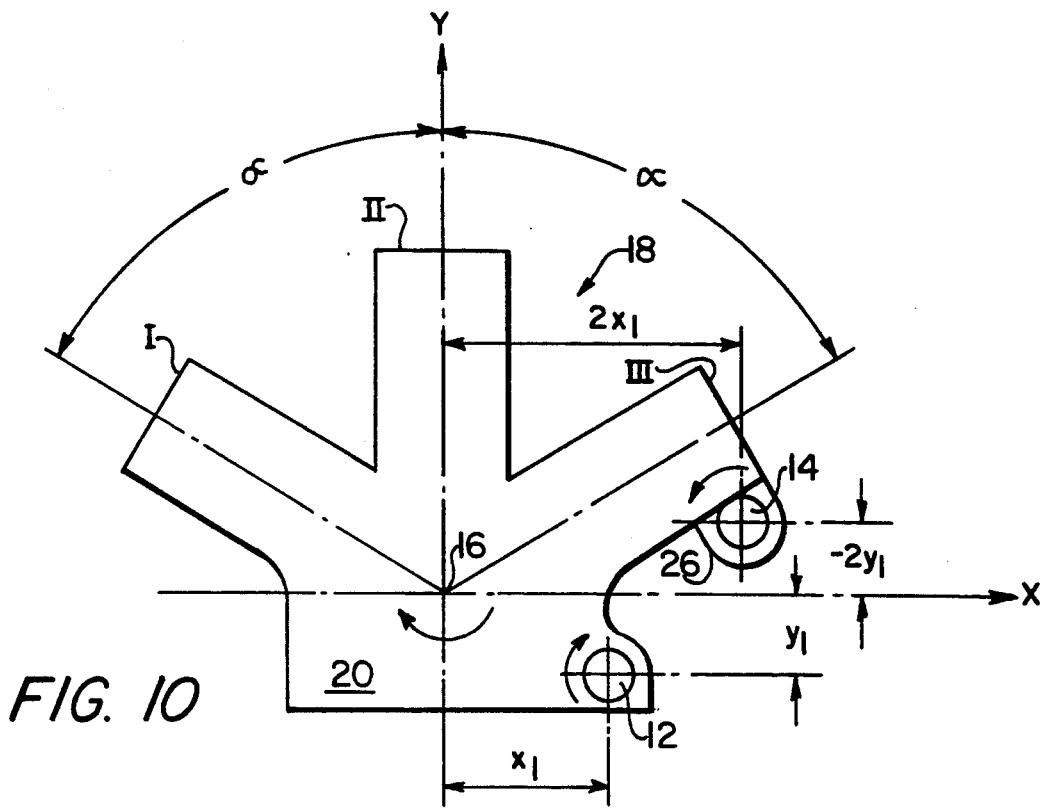
FIG. 10 shows the cylinder crankcase of a W12 internal combustion piston engine with two compensating shafts arranged on one side.

FIG. 10 finally shows in schematic form the front view of the cylinder crankcase 18 of the W12 internal combustion piston engine which is divided functionally into the crankcase 20 and into cylinder banks I, II, and III. The cylinder angles $\alpha$ are each 60 degrees. The crankshaft 10 not shown is pivotally mounted in the known manner in the case 18; the axis of rotation is labelled 16.

On the longitudinal side of cylinder bank III on the right in the drawing the first compensating shaft 12 is pivotally mounted in the area of the crankcase 20 and the second compensating shaft 14 is pivotally mounted laterally at the height of cylinder bank III in a separate case 26. Compensating shafts 12, 14 are driven in a manner not shown via a synchronous belt drive with twice the crankshaft rpm and in opposite directions of rotation, for which the directions of rotation are shown by arrows (compare also FIG. 9, also for the phase position of crankshaft 10 to compensating shafts 12, 14). The compensating shafts 12, 14 bear balancing weights 22, 24 in the known manner, as shown in FIG. 9.

The compensating shafts 12, 14 are arranged according to the aforementioned relation; i.e. the spacing of compensating shaft 12 in the x-direction of the coordinate axes shown by the broken line is $x_1$ and the spacing of compensating shaft 14 is $2x_1$. In addition, the spacing in the Y direction for compensating shaft 12 is $y_1$ and for compensating shaft 14 it is $-2y_1$, in each case referenced to the axis of rotation 16 of the crankshaft 10.

Figure 11:
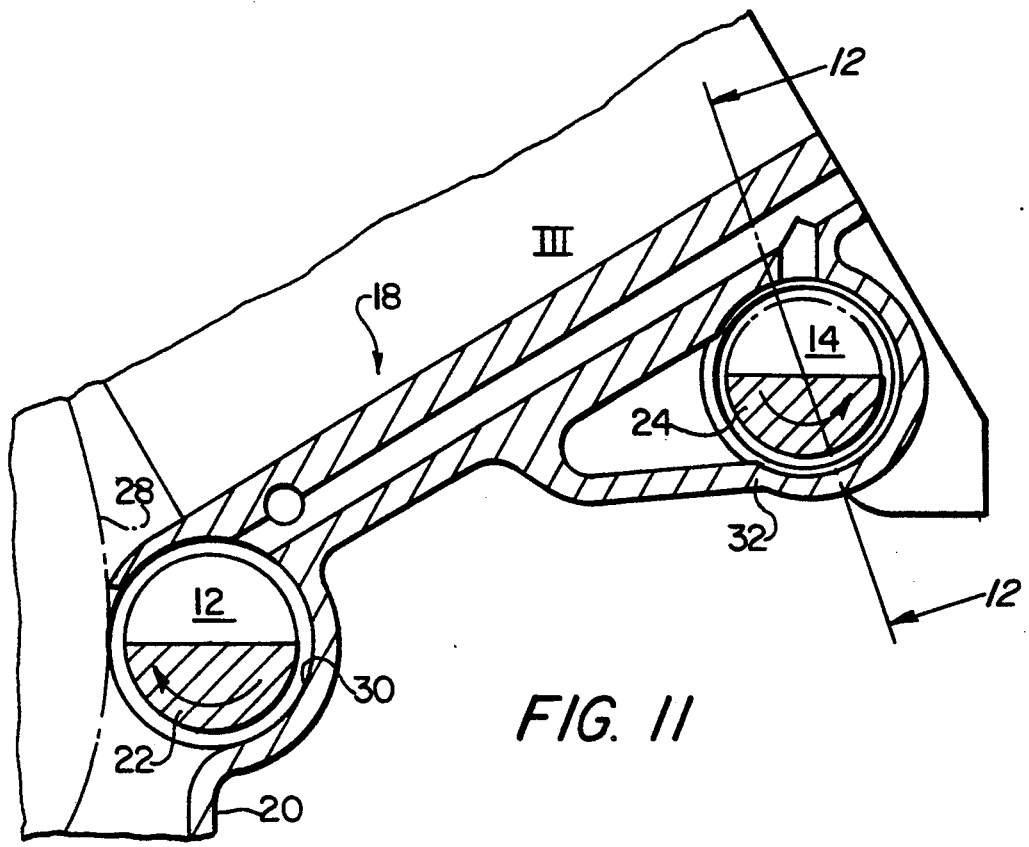
FIG. 11 shows an arrangement of compensating shafts directly in the cylinder crankcase of an internal combustion engine as per FIG. 10, in a section according to line XI—XI of FIG. 12.
Figure 12:
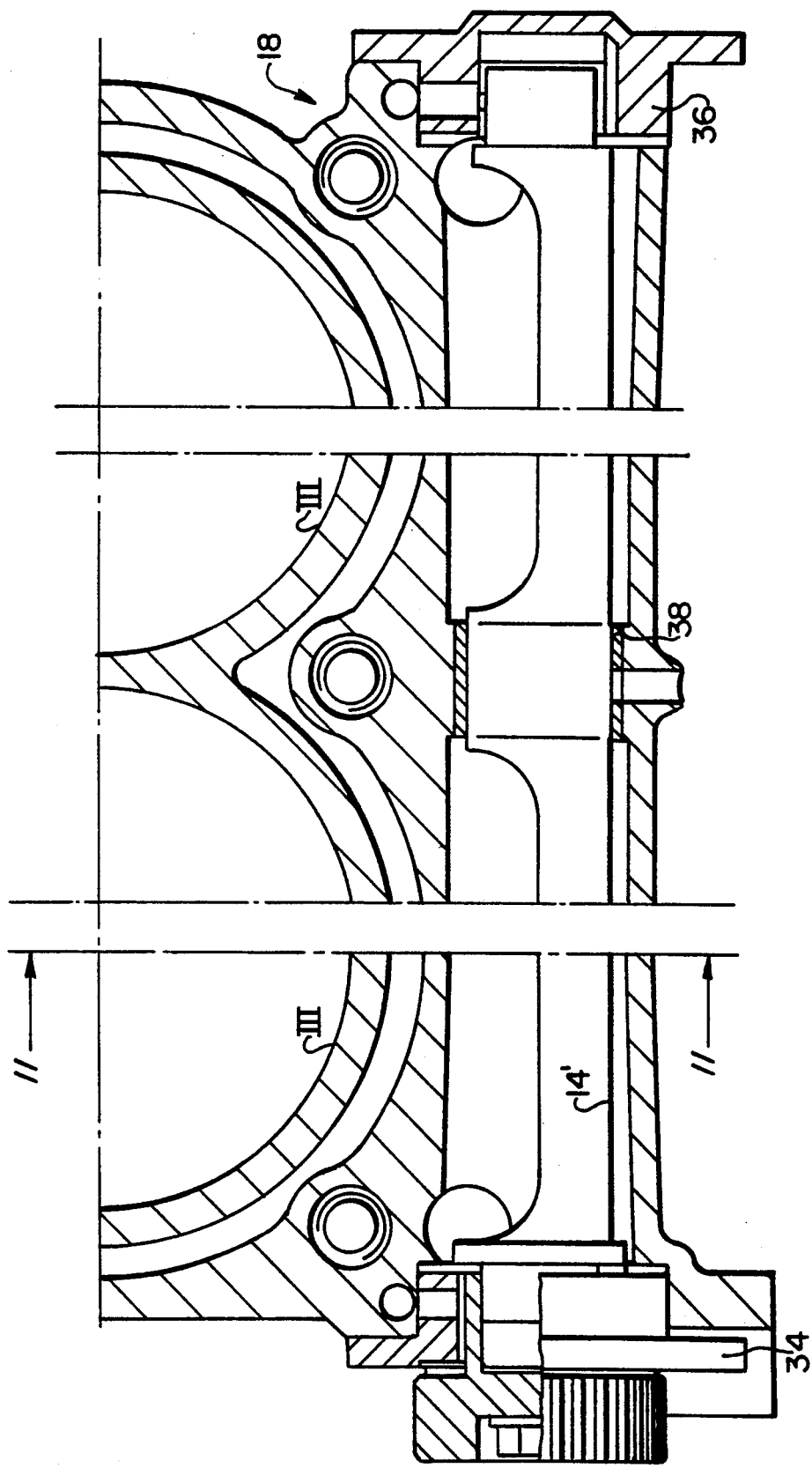
FIG. 12 shows a longitudinal section according to line XII—XII of FIG. 11 through the compensating shaft with bearing caps, the shaft being located laterally on cylinder side III.

FIGS. 11 and 12 show the arrangement of compensating shafts 12', 14' integrated directly in the cylinder crankcase 18 of the internal combustion engine. In this case the compensating shaft 12' (compare FIG. 11) is located near the envelope curve 28 given by connecting rod movements (connecting rod play), within a casing tunnel 30 molded onto the crankcase 20.

Another casing tunnel 32 is molded laterally onto the upper end of cylinder bank III of the cylinder crankcase and extends over its entire length. The compensating shaft 14' is pivotally mounted within the housing tunnel 32.

As FIG. 12 shows, the compensating shaft 14' is pivotally mounted in bearing caps 34, 36 on both its end. The bearing caps 34, 36 are screwed to the cylinder crankcase 18 in a manner not shown. There is another slide bearing 38 roughly in the center directly in the cylinder crankcase 18 and in the casing tunnel 32. The slide bearings of the compensating shafts 12', 14' are supplied with lubricating oil via lubricating oil channels not shown in greater detail.

The support of the compensating shaft 12' in the crankcase 20 is essentially identical to the compensating shaft 14' described above.

The described arrangement of the compensating shafts directly in the corresponding walls of the crankcase 20 or laterally along the cylinder bank II has the advantage that for relatively minor production costs the stipulated condition can be easily satisfied with regard to the geometrical arrangement of the compensating shafts with reference to crankshaft axis 16. The casing tunnels 30, 32 can be produced at the same time when casting the cylinder crankcase 18, for which the openings necessary for the compensating shafts are formed by the corresponding core pullers (sleeves).

The invention is not limited to the version shown or to the arrangement shown. For example, for construction reasons the compensating shafts 12, 14 can be shifted by changing dimension X or Y; the relation disclosed herein is decisive in this case.

We claim:

1. A mass compensator for an internal combustion piston engine including three cylinder banks in a W-formation with four cylinders each and one crankshaft with four crank pins, each crank pin being connected via three connecting rods with a respective piston of each of said three cylinder banks, the mass compensator comprising a first compensating shaft having coordinates $x_1$, $y_1$ relative to the crankshaft axis and a second compensating shaft having coordinates $x_2$, $y_2$ relative to the crankshaft axis, each of the compensating shafts carrying a balancing weight and being supported on the internal combustion engine and driven in opposite directions with twice the speed of the crankshaft, with the relationship of coordinates $x_1$, $y_1$ and $x_2$, $y_2$ satisfying essentially the following condition:

$y_2 = -2y_1$ $x_2 = +2x_1$.

2. The mass compensator according to claim 1, wherein the first and second compensating shafts are laterally located on a first side of the cylinder crankcase of the internal combustion engine.

3. The mass compensator according to claim 2, wherein the first compensating shaft is pivotally mounted on the crankcase and the second compensating shaft is pivotally mounted laterally on a third outer cylinder bank.

4. The mass compensator according to claim 2, wherein the first and second compensating shafts are supported in casing tunnels molded directly onto the cylinder crankcase.

5. The mass compensator according to claim 1, wherein the first compensating shaft is pivotally mounted on the crankcase and the second compensating shaft is pivotally mounted laterally on a third outer cylinder bank.

6. The mass compensator according to claim 5, wherein the first and second compensating shafts are supported in a casing tunnel molded directly onto the cylinder crankcase.

7. The mass compensator according to claim 6, wherein the second compensating shaft is pivotally mounted laterally on a third outer cylinder bank and said casing tunnel includes bearing caps on the ends of said second compensating shaft and holding corresponding axle journals of the second compensating shaft.

8. The mass compensator according to claim 1, wherein the first and second compensating shafts are supported in casing tunnels molded directly onto the cylinder crankcase.

* * * * *